Patented June 11, 1940

2,204,533

UNITED STATES PATENT OFFICE 2,204,533

CONSTRUCTIONAL MATERIAL

Albert C. Fischer, Chicago, Ill., assignor to The Philip Carey Manufacturing Company, a corporation of Ohio No Drawing. Original application December 3, 1926, Serial No. 152,519. Divided and this application August 23, 1929, Serial No. 388,044

6 Claims. (Cl. 94—18)

My present invention relates to a novel and improved constructional material composed of roofing scrap, and particularly pertains to such composition materials as slabs, blocks, or planks which are preformed into rail fillers, expansion joint, paving blocks and the like.

This application is a division of Serial No. 152,519, filed December 3, 1926, which relates to a process of manufacture.

In the production of composition roofing material, especially in the production of individual composition shingles or composition shingle strips, the cutting operation necessary to make up the shingle design results in considerable waste, commonly termed "roofing scrap." Very little, if any, use is made of this roofing scrap so far as concerns the roofing manufacturer. Consequently it can be purchased at a nominal cost. The roofing material from which this scrap results is felt saturated with an abundance of asphalt or other such bituminous substance, and I have discovered that by collecting this scrap and treating the same as will be hereinafter explained, I can develop an unusually acceptable product. The form of the same is immaterial in so far as concerns the present invention, although I am confined to making the product as a preformed piece of goods, that is to say, it is not to be confused with a liquid substance.

This so-called roofing scrap may be collected from the roofing manufacturers in irregular pieces or cut-out tabs and in different thicknesses, ranging from 1 to 4 ply, depending upon the thickness of the material from which the scrap is left. More often the scrap would be about ⅛ of an inch in thickness. Frequently the scrap will be surfaced with subdivided mineral material, such as mica, slate particles, rock particles, or even small pebbles as a result of cutting the tabs from sheet material which has been surfaced with such subdivided mineral substance.

Since both the plain and the surfaced scrap may be obtained I am enabled to regulate the mineral content of the product which I develop by mixing measured quantities of mineral surfaced scrap with measured quantities of the unsurfaced scrap. On the other hand I may eliminate such a mineral content in the product by using the unsurfaced scrap in the mixture.

In treating the scrap to develop the products as explained, I employ as a first step in the process or method some means that will subject the scrap to a sufficiently high temperature to melt the asphalt or bituminous material with which the felt is saturated. Since an essential step in the process involves an agitation or thorough mixing I have found that a heavy duty steam-jacketed mechanical mixing apparatus is suitable for this purpose. The materials introduced into such a mixer are thoroughly agitated at a temperature sufficient to melt the bituminous substance. Care should be taken that the mixing operation continues for a sufficient length of time to completely melt the bituminous substance as well as thoroughly mix the released felt fibers, so that a uniform mixture results. Successive quantities of the scrap may be introduced into the apparatus rather than filling the apparatus to capacity at one time. This will insure a better mixture.

After the mixing step the mixture is removed from the apparatus, and without undue loss of time, that is to say, while it is in a warm plastic flowable condition I extrude the same into the products hereinbefore mentioned. This second step may be carried out in various ways. For the most part I would prefer to use an extruding apparatus. The material while, as stated, being in a warm, plastic, flowable condition, I am enabled to extrude it into various preformed products, such as, blocks, slabs, boards, bricks, cylinders, tubes, or any possible design or shape that an extruding apparatus is equipped to accommodate. In lieu of the extruding apparatus it is possible to use a sheet forming apparatus which will reduce the material into sheets, and the sheets may then be cut in any desired shape, for instance, as strips, boards, planks, or the like. The sheet forming apparatus can be regulated to predetermine the thickness of the sheets, with the result that in using the sheet forming apparatus instead of the extruding apparatus I am not confined to making products with a reduced thickness.

After being extruded or otherwise formed into the ultimate shape of the products desired I would ordinarily compress the same with a hydraulic pressing machine to increase the density of the product. The amount of pressure used would determine the inherent quality of the ultimate product. For instance, in making up a paving block or a brick, or any other product that would be subjected to traffic or other wearing conditions, or where it was to be expected that the product would support a weight, as in the case of a foundation, the density of the product should be at its maximum, whereas in the case of uses where it would not be subjected to wear and tear, as in the case of a lining for insulation purposes, it need not be compressed to its maximum. Furthermore, regulating the compression or the density of the product will adapt the material to certain uses to its greatest efficiency, as in the case of uses which would require inherent compressibility in the product it would not be desirable to use too much pressure. For this reason the compression to which the products are subjected is a more or less controlling factor so far as concerns the product.

From the above it will be seen that by simply taking this roofing scrap as it is left after cutting the sheets into shingles or shingle strips, and without the addition of any other material I can develop construction material which will have the inherent qualities of water or moisture proofing, soundproofing, and a material that will withstand wear and tear of traffic in streets, floors, bridge flooring, or that may be used for other purposes. It may be manufactured economically, conveniently, and is well adapted to serve a variety of purposes, depending upon the way that it is made.

In the sub-joined claims, where the term "roofing scrap" is used it is intended that the same should be interpreted as covering roofing material of the class herein referred to, that is to say, sheets of felt saturated with bituminous material as the same are known to the composition roofing art.

I claim:

1. A preformed construction block-like strip containing a plastic waterproof binder, shredded fibrous waste materials and mineral particles.

2. A preformed construction block-like strip containing a plastic waterproof binder and shredded roofing waste comprised of felt saturated and coated with asphalt and surfaced with granular material.

3. A preformed construction block-like strip containing a plastic waterproof binder and shredded roofing waste comprised of felt saturated and coated with asphalt.

4. A preformed construction block-like strip containing a plastic waterproof binder and shredded waste bituminized fabrics.

5. A preformed construction block-like strip containing a plastic waterproof binder and shredded asphalt roofing waste.

6. A preformed construction block-like strip containing a plastic waterproof binder and shredded fibrous waste materials.

ALBERT C. FISCHER.